(12) United States Patent
Zuo

(10) Patent No.: US 12,213,589 B2
(45) Date of Patent: Feb. 4, 2025

(54) MULTI-PURPOSE RACK CROSSBAR, MULTI-PURPOSE RACK CROSSBAR DEVICE AND SUCKER

(71) Applicant: SHANGHAI ZUOS TOOLS CO., LTD., Shanghai (CN)

(72) Inventor: Shiping Zuo, Shanghai (CN)

(73) Assignee: SHANGHAI ZUOS TOOLS CO., LTD., Shanghai (CN)

( * ) Notice: Subject to any disclaimer, the term of this patent is extended or adjusted under 35 U.S.C. 154(b) by 347 days.

(21) Appl. No.: 17/661,560

(22) Filed: May 1, 2022

(65) Prior Publication Data
US 2023/0232981 A1 Jul. 27, 2023

(30) Foreign Application Priority Data

Jan. 24, 2022 (CN) .......................... 202210078839.1

(51) Int. Cl.
 *A47B 96/14* (2006.01)
 *F16B 47/00* (2006.01)
(52) U.S. Cl.
 CPC .......... *A47B 96/1466* (2013.01); *F16B 47/00* (2013.01)
(58) Field of Classification Search
 CPC .............................. A47B 96/1466; F16B 47/00
 See application file for complete search history.

(56) References Cited

U.S. PATENT DOCUMENTS

| | | | | |
|---|---|---|---|---|
| 4,274,570 A | * | 6/1981 | Bott ........................ | B60R 9/045 224/326 |
| 6,237,983 B1 | * | 5/2001 | Yang ........................ | B60J 11/02 224/559 |
| 6,446,850 B2 | * | 9/2002 | Ming-Shun ............. | B60R 9/058 224/325 |
| 7,458,490 B2 | * | 12/2008 | Klinkman ............... | B60R 9/045 548/549 |
| 7,726,528 B2 | * | 6/2010 | Foley ...................... | B60R 9/048 315/315 |
| 9,718,410 B2 | * | 8/2017 | Cropley .................. | B60R 9/058 |
| 11,577,658 B2 | * | 2/2023 | Keck ....................... | B60R 9/045 |
| 2020/0223371 A1 | * | 7/2020 | Menegazzo ............. | B60R 9/048 |

FOREIGN PATENT DOCUMENTS

CN 214036479 U * 8/2021
TW M607708 U * 2/2021

* cited by examiner

*Primary Examiner* — Ko H Chan
(74) *Attorney, Agent, or Firm* — CBM PATENT CONSULTING, LLC

(57) ABSTRACT

A multi-purpose rack crossbar includes: a rack crossbar body, and a first mounting component removably connected to the rack crossbar body; the rack crossbar body is provided with a first mounting groove and at least one second mounting groove, the first mounting groove is removably connected to a first end of the first mounting component, and a runner assembly is provided at a second end of the first mounting component; the multi-purpose rack crossbar device includes: a second mounting component fitted and connected to the second mounting groove, and the multi-purpose rack crossbar; the sucker includes: the multi-purpose rack crossbar or the multi-purpose rack crossbar device.

33 Claims, 14 Drawing Sheets

MULTI-PURPOSE RACK CROSSBAR, MULTI-PURPOSE RACK CROSSBAR DEVICE AND SUCKER

CROSS REFERENCES

This application claims priority to Chinese Patent Application Ser. Nos. CN2022100788391 and CN2022201933631 filed on 24 Jan. 2022.

TECHNICAL FIELD OF THE INVENTION

The present application belongs to the technical field of suction devices, and particularly relates to a multi-purpose rack crossbar, a multi-purpose rack crossbar device and a sucker.

BACKGROUND OF THE INVENTION

Ordinary roof-mounted accessories are generally mounted on roof racks on both sides of a roof by crossbars, while no roof racks are available for most vehicle models. If needed, luggage rack crossbars designed especially for a vehicle model are fixed on the roof by being hooked at door edges, and then accessories such as luggage rack, luggage case and bicycle rack are mounted thereon. The rack crossbars need to be removed after self-driving tour or use, or will cause wind noise and fuel consumption increase when the car is in motion and also affect the aesthetics. As a result, there is an additional tedious process of mounting and removing the crossbars, and door weather strips may be damaged by being hooked. The single-purpose crossbars are hard to meet diversified use requirements. Moreover, existing crossbars cannot solve the problem of adaptability, and suckers used together with the crossbars cannot be intelligently controlled.

SUMMARY OF THE INVENTION

In view of the above shortcomings or deficiencies of the prior art, a technical problem to be solved in the present application is to provide a multi-purpose rack crossbar, a multi-purpose rack crossbar device and a sucker.

In order to solve the above technical problem, the present application is implemented by the following technical solutions.

According to one aspect of the present application, a multi-purpose rack crossbar is provided, including: a rack crossbar body, and a first mounting component connected to the rack crossbar body; the rack crossbar body is provided with a first mounting groove and at least one second mounting groove, the first mounting groove is connected to a first end of the first mounting component, and a runner assembly is provided at a second end of the first mounting component.

Optionally, in the multi-purpose rack crossbar, the first mounting groove includes: a first opening portion, and a first receiver which is connected to and wider than the first opening portion.

Optionally, in the multi-purpose rack crossbar, the first receiver includes: a first tapered portion and a first top, which are connected to each other and at least enclosed to form the first receiver having an opening.

Optionally, in the multi-purpose rack crossbar, the width of a large end of the first tapered portion gradually decreases to that of a small end thereof, where the large end is connected to the first opening portion while the small end is connected to the first top.

Optionally, in the multi-purpose rack crossbar, the first mounting component includes: a mounting slider fitted to the first mounting groove, and a mounting rod with a first end connected to the mounting slider and a second end of a spherical structure.

Optionally, in the multi-purpose rack crossbar, a receiving space for adjusting the mounting rod in the vertical direction is further provided on the top of the first mounting groove.

Optionally, in the multi-purpose rack crossbar, the first mounting component further includes: at least one retaining clip mounted on the mounting rod.

Optionally, in the multi-purpose rack crossbar, when the mounting rod is of a screw structure, the retaining clip includes: a nut structure fitted to the screw structure.

Optionally, in the multi-purpose rack crossbar, the runner assembly includes: a universal structure consisting of the spherical structure and a third mounting groove fitted to the spherical structure.

Optionally, in the multi-purpose rack crossbar, the second mounting groove includes: a second opening portion, and a second receiver which is connected to and wider than the second opening portion.

Optionally, in the multi-purpose rack crossbar, the second receiver includes: a first rectangular portion connected to the second opening portion.

Optionally, in the multi-purpose rack crossbar, the second receiver further includes: a first retaining nest; the first rectangular portion and the first retaining nest are connected to each other and at least enclosed to form the second receiver having an opening.

Optionally, in the multi-purpose rack crossbar, the first rectangular portion is connected to a large end of the first retaining nest.

Optionally, in the multi-purpose rack crossbar, the first rectangular portion is wider than the second opening portion, and is wider than or as wide as the large end of the first retaining nest.

Optionally, the multi-purpose rack crossbar further includes a closure head mounted at each end of the rack crossbar body, and a connecting portion of the closure head is in drive fit and connected to a plurality of hollow channels in the rack crossbar body; and/or recess holes fitted to the second mounting groove are further formed in the closure head.

Optionally, in the multi-purpose rack crossbar, the rack crossbar body is of an axisymmetric structure.

According to another aspect of the present application, a multi-purpose rack crossbar device is provided, including: a second mounting component fitted and connected to the second mounting groove, and the multifunctional rack crossbar.

Optionally, in the multi-purpose rack crossbar device, the second mounting component includes: a first fixed link fitted to the second mounting groove.

Optionally, in the multi-purpose rack crossbar device, the second mounting component further includes: a grip knob, and a first fixed link fitted and connected to the grip knob.

Optionally, in the multi-purpose rack crossbar device, the second mounting component includes: a second fixed link, and a retainer fitted to the second fixed link and the second mounting groove.

Optionally, in the multi-purpose rack crossbar device, when the second fixed link is a mounting bolt, the second mounting component further includes: a third nut and a third gasket, which are both fitted and connected to and mounted on the second fixed link.

Optionally, in the multi-purpose rack crossbar device, a movable lifting yoke is further provided at one end of the second fixed link.

Optionally, in the multi-purpose rack crossbar device, the second mounting component further includes: an anti-skid rubber protection pad, on which at least one mounting portion fitted to the second mounting groove is provided.

According to another aspect of the present application, a sucker is further provided, including the multi-purpose rack crossbar or the multi-purpose rack crossbar device.

Optionally, in the sucker, the sucker body includes: a suction cup and a mounting base for mounting the suction cup, and a mounting hole is formed on the mounting base.

Optionally, in the sucker, a deflation yoke is further provided on the suction cup.

Optionally, the sucker is an electric sucker, comprising a suction pump having an air pipe communicated with the suction cup.

Optionally, in the sucker, a check valve is further provided on the air pipe.

Optionally, in the sucker, the check valve may also be replaced with a normally closed electromagnetic gas valve.

Optionally, in the sucker, a Printed Circuit Board (PCB) is further provided inside the sucker body, and an MCU control circuit, a pressure acquisition circuit, a Bluetooth transmission circuit, an LCD circuit and a power management circuit (PMU) are provided on the PCB.

Optionally, in the sucker, a display module electrically connected to the PCB is further provided on the sucker body.

Optionally, the sucker further includes a pressure sensor, which is provided on the suction cup and electrically connected to the PCB.

Optionally, the sucker further includes an operational power supply mounted on the sucker body.

Optionally, in the sucker, a plurality of buttons are further provided on the sucker body.

Optionally, the sucker further includes a communication module, which is provided on the sucker body and electrically connected to the PCB.

Optionally, in the sucker, the wireless communication module includes: a Bluetooth module.

Compared with the prior art, the technical effects of the present application are as follows.

The multi-purpose rack crossbar in the present invention can improve the mounting adaptability by providing the rack crossbar body and the first mounting component, and the second mounting grooves may also be used together with other mounting components, so that the rack crossbar can be applied widely.

The sucker in the present application can be suitable for different vehicle models, especially for vehicle models without a roof rack and traffic facilities such as yachts, and different external hanging devices can be mounted at any time as needed.

Each vacuum sucker used together with the rack crossbar body can automatically adjust the goodness of fit to the surface of a sucked object. The vehicle-mounted rack is firmly sucked on a suction surface of the vacuum sucker through electric suction.

The sucker in the present application is easy to operate, safe and reliable, and, when in operation, can detect the pressure inside the suction cup at any time and automatically make up air to keep the pressure always within a default safety range. The sucker can display its operating state at any time, reflect its real-time condition at any time on an interactive electronic device through Bluetooth transmission, and give an alarm in time in case of any anomalies, which greatly enhances its safety and the user's confidence in use.

BRIEF DESCRIPTION OF THE DRAWINGS

Other features, objectives and advantages of the present application will become more apparent by reading the detailed description of non-restrictive embodiments with reference to the following drawings.

DETAILED DESCRIPTION OF THE INVENTION

The technical solutions in embodiments of the present application will be clearly and completely described as below with reference to the accompanying drawings in the embodiments of the present application. Obviously, the described embodiments are only a part of, not all of, the embodiments of the present application. All other embodiments obtained by those of ordinary skill in the art based on the embodiments of the present application without paying any creative effort shall fall into the protection scope of the present application.

Figure 1:
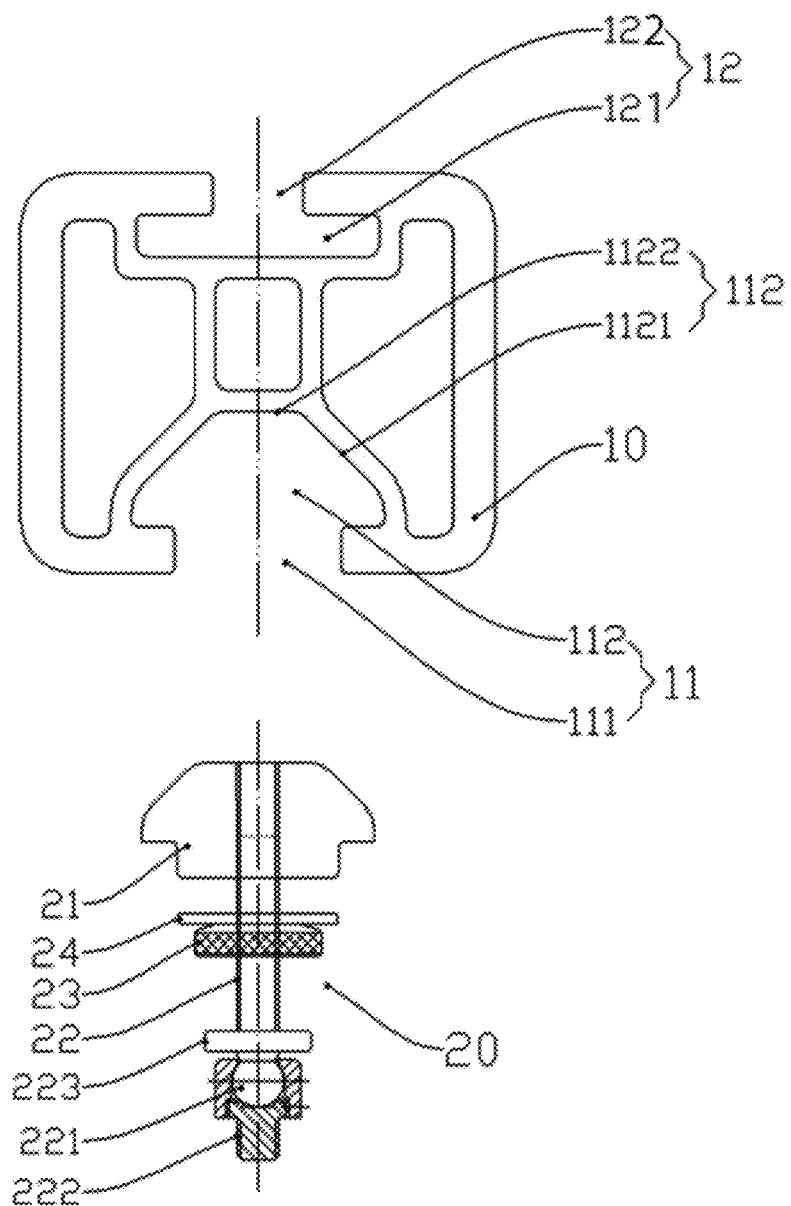
FIG. 1 is a sectional view of a multi-purpose rack crossbar according to an embodiment of the present application.
Figure 2:
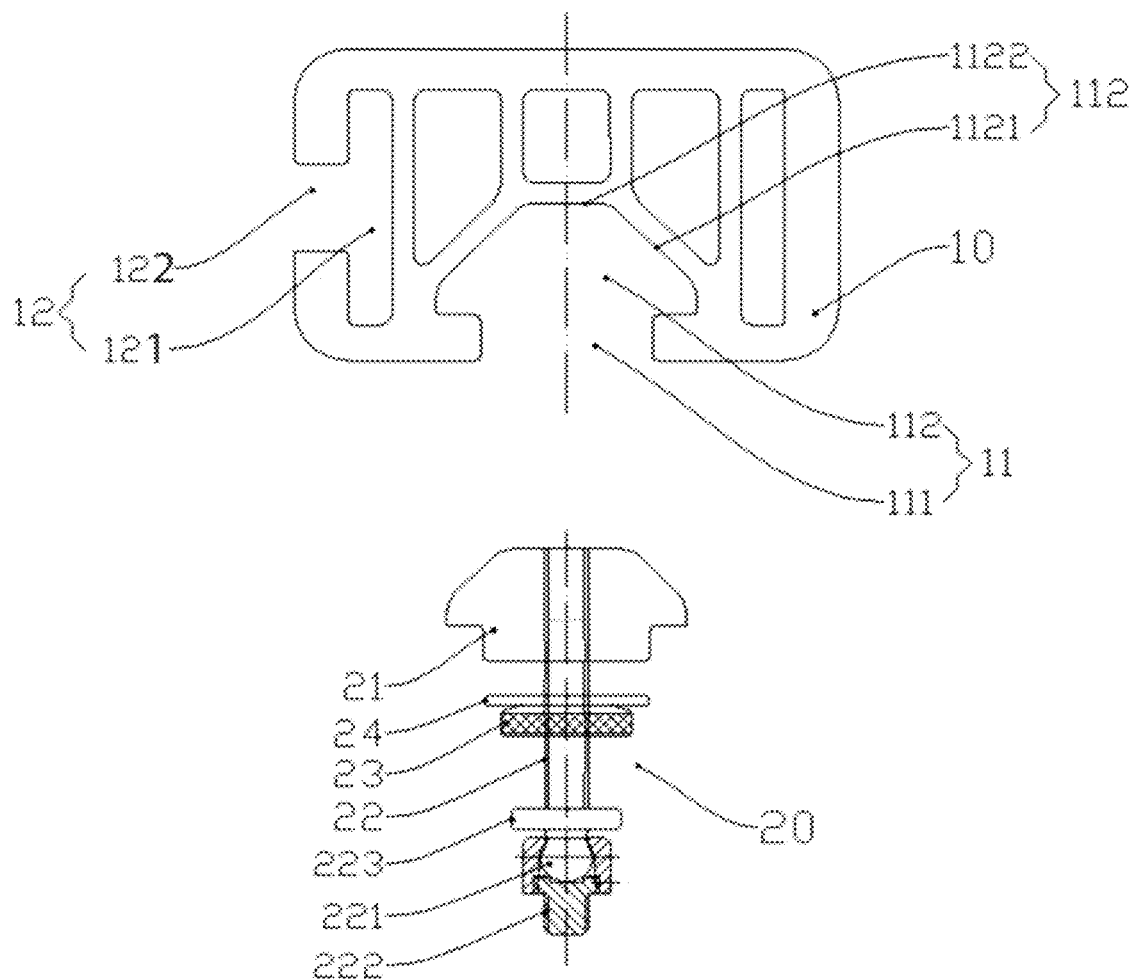
FIG. 2 is a sectional view of a multi-purpose rack crossbar according to another embodiment of the present application.
Figure 3:
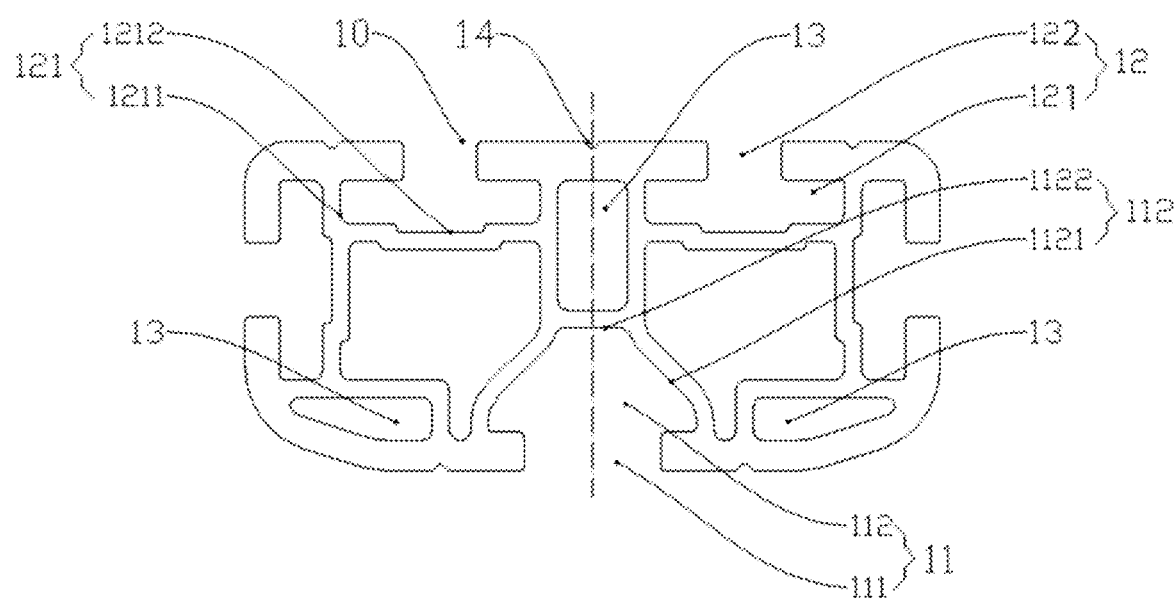
FIG. 3 is a sectional view of a multi-purpose rack crossbar according to yet another embodiment of the present application.

As shown in FIGS. 1 to 3, in one embodiment of the present application, a multi-purpose rack crossbar is provided, including: a rack crossbar body 10, and a first mounting component 20 connected to the rack crossbar body 10. The rack crossbar body 10 is provided with a first mounting groove 11 and at least one second mounting groove 12, the first mounting groove 11 is connected to a first end of the first mounting component 20, and a runner assembly is provided at a second end of the first mounting component 20.

The multi-purpose rack crossbar in this embodiment may be used together with suckers described below to mount external hanging devices such as luggage rack, box, tray, bag, bicycle rack, surfboard, kayak, snowboard, awning, off-road lights, and camera products.

In this embodiment, the runner assembly includes a universal structure. The universal structure includes a spherical structure 221 and a third mounting groove 222 fitted to the spherical structure 221. The spherical structure 221 can rotate 360 degrees around the third mounting groove 222. The universal structure may also be a universal joint or a universal shaft and other components that can rotate 360 degrees.

The first mounting component 20 can move reciprocally in a mounting direction of the first mounting groove 11. After moving to a predetermined position, the first mounting component 20 is fixed to the first mounting groove 11 by following structures such as a mounting rod 22 and a first nut 23 described below.

As shown in FIGS. 1 to 3, the rack crossbar body 10 is of three different structures. Specifically, as shown in FIG. 1, the second mounting groove 12 is provided on the top of rack crossbar body 10. As shown in FIG. 2, the second mounting groove 12 is provided on a side face of the rack crossbar body 10. As shown in FIG. 3, the second mounting grooves 12 are provided on the top and the side face of the rack crossbar body 10. The above different structures are not exhaustive but merely enumerated. The position of the second mounting grooves 12 may be adjusted according to actual needs.

It should be noted that, in this embodiment, the first mounting groove 11 and the second mounting groove 12 may be of the same or different structures, and the structures of the first mounting component 20 and the second mounting component are adjusted correspondingly.

More preferably, to ensure the mounting stability, the rack crossbar body 10 is preferably of an axisymmetric structure, such as the structures shown in FIGS. 1 and 3.

In different embodiments as shown in FIGS. 1 to 3, the first mounting groove 11 is basically of the same structure. Specifically, the first mounting groove 11 includes a first opening portion 111 and a first receiver 112 which is connected to and wider than the first opening portion 111, the width difference is easy for clamping in a fixed or sliding way, and the first mounting component 20 can slide in the mounting direction of the first mounting groove 11. The first mounting groove 11 is preferably of a T-groove structure. Correspondingly, a mounting slider described below in the first mounting component may be of a T type screw structure fitted and connected to the T-groove structure.

The first mounting groove 11 may also of a specific structure described below of the second mounting groove 12.

The first receiver 112 includes a first tapered portion 1121 and a first top 1122, which are connected to each other and at least enclosed to form the first receiver 112 having an opening. The first receiver 112 is in the shapes including but not limited to a trapezoidal structure, or other structures such as a circular, triangular or ellipsoidal structure.

More preferably, the width of a large end of the first tapered portion 1121 gradually decreases to that of a small end thereof. The large end is connected to the first opening portion 111 while the small end is connected to the first top 1122.

Further, as shown in FIGS. 1 to 3, the first mounting component 20 is basically the same in different embodiments. The first mounting component 20 includes the mounting slider 21 and the mounting rod 22 with a first end connected to the mounting slider 21 and a second end of the spherical structure 221, and the mounting slider 21 is fitted to the first mounting groove 11. With the first mounting component 20, the rack crossbar body 10 and a sucker body 40 described below can be rotatably connected.

The mounting slider 21 is preferably of a T type screw structure fitted to the first mounting groove 11.

More preferably, in this embodiment, a receiving space for adjusting the mounting rod 22 in the vertical direction is further provided on the top of the first mounting groove 11. The receiving space is not limited in a specific structure.

Preferably, the first mounting component 20 further includes: at least one retaining clip mounted on the mounting rod 22.

In this embodiment, when the mounting rod 22 is of a screw structure, the retaining clip includes: a nut structure fitted to the screw structure.

Further, the nut structure includes a first nut 23 mounted on the mounting rod 22, and a first gasket 24 used together with the first nut 23. The first gasket 24 functions to improve the connection stability between the mounting slider 21 and the first nut 23.

More preferably, the nut structure further includes a second nut 223 mounted on the mounting rod 22. The second nut 223 functions to connect and fix the first mounting component 20 to the sucker body 40 described below.

Further, as shown in FIGS. 1 to 3, the second mounting groove 12 includes a second opening portion 122, and a second receiver 121 which is connected to and wider than the second opening portion 122.

It should be noted that, in this embodiment, the second mounting groove 12 may be of the structures shown in FIGS. 1 to 3 and also of the above specific structure of the first mounting groove 11. When the first mounting groove 11 is of the structure of the second mounting groove 12, the structure of the first mounting component 20 is adjusted correspondingly.

The second mounting groove may also be of the above specific structure of the first mounting groove 11.

Further, the second receiver 121 includes: a first rectangular portion 1211 connected to the second opening portion 122. The first rectangular portion 1211 may function to achieve a snap or movable connection, etc.

More preferably, the second receiver 121 further includes a first retaining nest 1212. The first rectangular portion 1211 and the first retaining nest 1212 are connected to each other and at least enclosed to form the first receiver 112 having an opening. With the above first rectangular portion 1211, it is easy for rotary connection of the second mounting component described below, and the above first retaining nest 1212 is propped against part of a bolt in the second mounting component described below for retaining. The above structure is flexible and highly adaptable.

Further, the first retaining nest 1212 is preferably of a trapezoidal structure, which is exemplified in this embodiment. The first rectangular portion 1211 is connected to a large end of the first retaining nest 1212.

More preferably, the first rectangular portion 1211 is wider than the second opening portion 122, and is wider than or as wide as the large end of the first retaining nest 1212.

Figure 4:
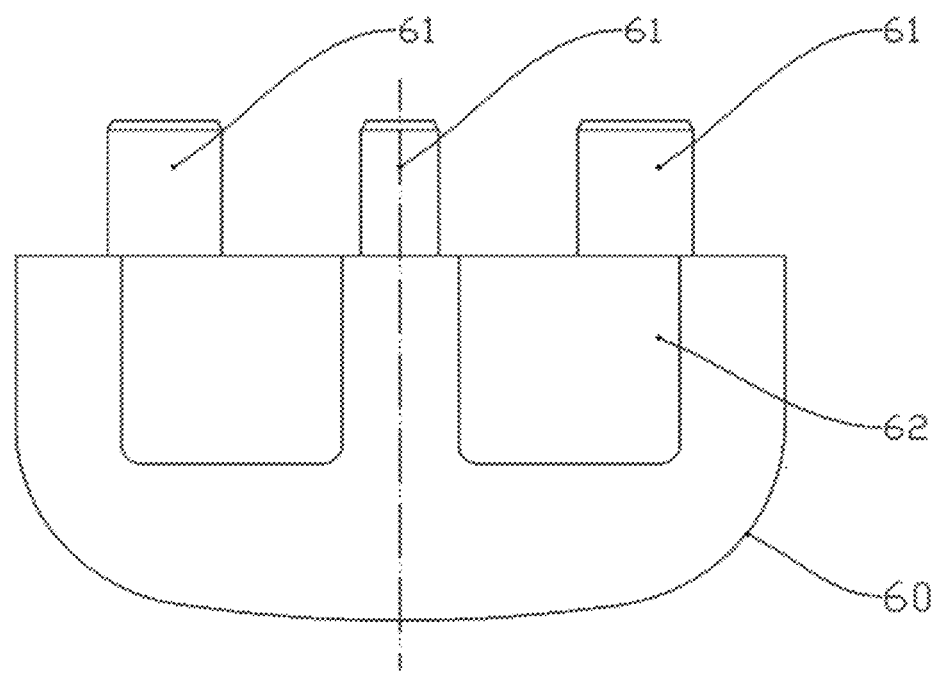
FIG. 4 is a side view of a closure head according to the present application.

As shown in FIG. 4, in this embodiment, the multi-purpose rack crossbar further includes a closure head 60 mounted at each end of the rack crossbar body 10, and a connecting portion of the closure head 60 is fitted and connected to a plurality of hollow channels 13 (see FIG. 3) in the rack crossbar body 10. With the closure head 60, the rack crossbar body 10 can be mounted more reliably.

Specifically, the rack crossbar body 10 may be provided with three hollow channels 13 as shown in FIG. 3, and the closure head 60 is correspondingly provided with three mounting tenons 61 corresponding to the positions of the hollow channels 13 and can be mounted by snapping the mounting tenons 61 into the hollow channels 13. With the hollow channels 13, the rack crossbar body 10 may also be lighter. In this embodiment, only the case where three hollow channels 13 are provided is illustrated.

The closure head 60 not only improves the aesthetics of the rack crossbar body 10, but also has certain use functions. For example, several mounting sliders 21 of the first mounting components 20 are placed into the first mounting grooves 11 on the rack crossbar body 10, and then the closure heads 60 are mounted on both ends of the rack crossbar body 10. When in use, the suckers described below are mounted by the first mounting components 20, and when not in use, the first mounting components 20, i.e., the suckers, are removed, so that the first mounting components 20 will not fall out of the first mounting grooves 11. More preferably, the tail of the first mounting component 20 (such as the tail of the above mounting rod 22) is preferably of a square structure, which is hard to rotate and can be mounted more stably.

Further, in this embodiment, recess holes fitted to the second mounting groove 12 are further formed in the closure head 60. The recess hole 62 is configured to mount the second mounting component described below. For example, a plurality of the second mounting components are first placed into the second mounting grooves 12 on the rack crossbar body 10. Preferably, the recess hole 62 is preferably a square recess hole, and correspondingly, the tail of a first fixed link 311 or a second fixed link 321 described below is preferably a square structure, which is hard to rotate in the second mounting groove 12, and can be mounted more stably.

More preferably, the mounting tenons 61 and the hollow channels 13 are arranged in a triangular pattern to further improve the mounting stability and reliability.

In this embodiment, a multi-purpose rack crossbar device is further provided, including: a second mounting component and the multi-purpose rack crossbar. The second mounting component is fitted to the second mounting groove 12. The specific technical solution of the above sucker bracket is described above and will not be repeated here.

Figure 5:
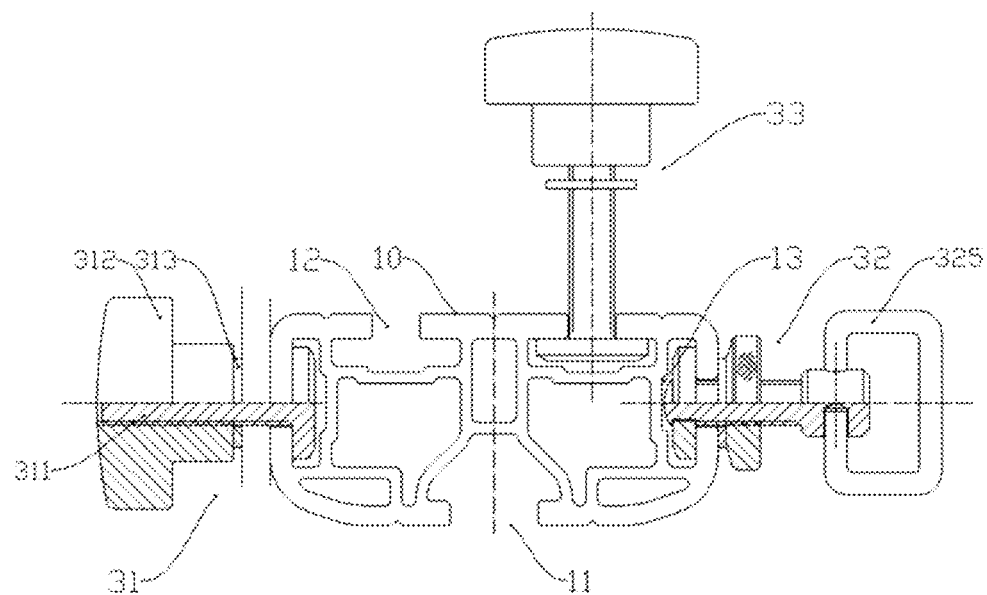
FIG. 5 is a schematic diagram in which second mounting components of different structures are mounted on a rack crossbar body according to the embodiment of the present application.
Figure 6:
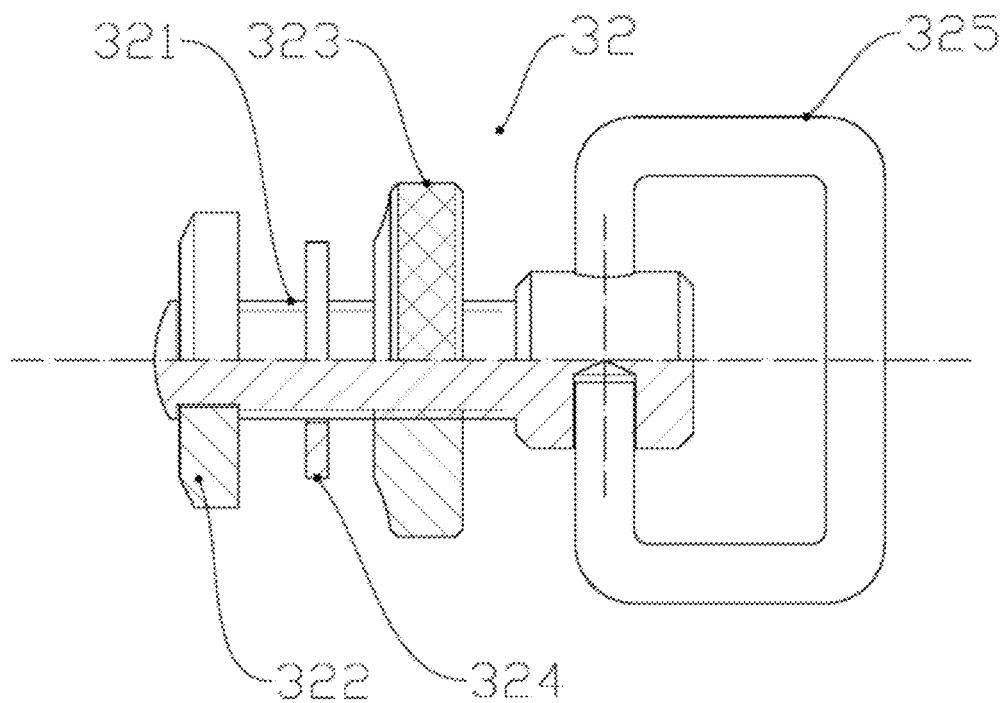
FIG. 6 is a structural diagram of one of the second mounting components according to the embodiment of the present application.

In this embodiment, the second mounting component may be of different structures, as shown in FIGS. 5 to 6.

A first structure 31 is shown in FIG. 5, and the second mounting component includes a first fixed link 311 fitted to the second mounting groove 12. With the second mounting component 31, other external hanging devices can be mounted.

Further, the second mounting component further includes: a grip knob 312 mounted at one end of the first fixed link 311. The grip knob 312 is provided to facilitate the user to hold or operate, etc. Further, the grip knob 312 is preferably a star grip knob.

Further, the first fixed link 311 is further provided with a second gasket 313 in this structure to improve the connection stability and reliability.

A second structure 32 is shown in FIGS. 5 and 6. The second mounting component includes: a second fixed link 321, and a retainer 322 fitted to the second fixed link 321 and the second mounting groove 12.

More preferably, when the second fixed link 321 is a mounting bolt, the second mounting component further includes a third nut 323 and a third gasket 324, which are both mounted on the second fixed link 321.

A movable lifting yoke 325 is rotatably mounted at one end of the second fixed link 321. The movable lifting yoke 325 may be used together with ropes and other structures to assist or enhance the mounting of other external hanging devices. The movable lifting yoke 325 may be provided with a tie or a tightener, and a curved structure suitable for connecting and mounting bars 22 of various conventional vehicle-mounted luggage cases is provided below the rack crossbar body 10.

A third structure type 33 is shown in FIG. 5. The difference between this structure and the first structure is that a longer first fixed link 311 may be provided as needed in this structure, and the rest is the same as that of the first structure 31.

Figure 7:
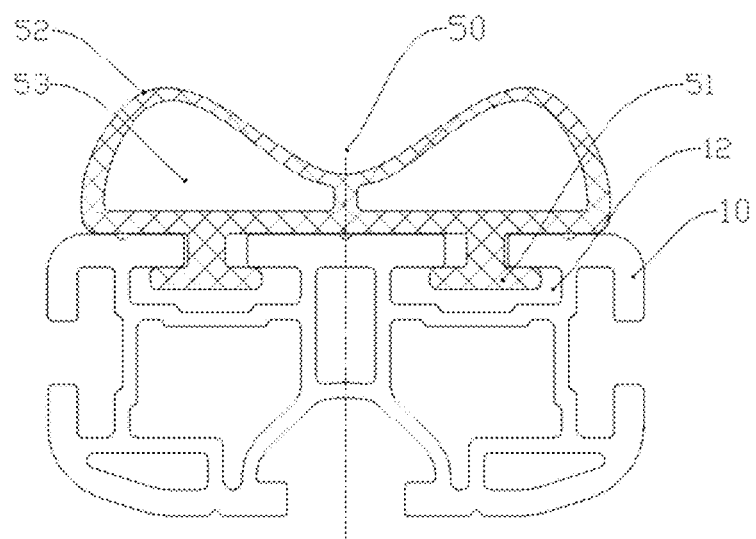
FIG. 7 is a structural diagram of an anti-skid pad mounted according to the embodiment of the present application.

Further, in this embodiment, as shown in FIG. 7, the second mounting component further includes: an anti-skid rubber protection pad 50, on which at least one mounting portion 51 fitted to the second mounting groove 12 is provided. The mounting portion 51 is preferably of an inverted T-shaped structure. The anti-skid rubber protection pad 50 has the functions of cushioning, shock absorption, friction prevention and the like, so that the external hanging devices placed thereon can be mounted firmly.

The anti-skid rubber protection pad 50 includes: bulges 52, and hollow cavities 53 formed inside the bulges 52. The hollow cavity 53 can provide a certain space for extrusion deformation of the bulge 52. Moreover, the hollow cavity 53 can also reduce the mass of the anti-skid rubber protection pad 50 to achieve the light weight, anti-skid and shock-absorbing effects.

Further, the anti-skid rubber protection pad 50 is preferably of a symmetrical structure, in which the bulges 52 are symmetrically provided around a central axis of the anti-skid rubber protection pad 50.

Figure 8:
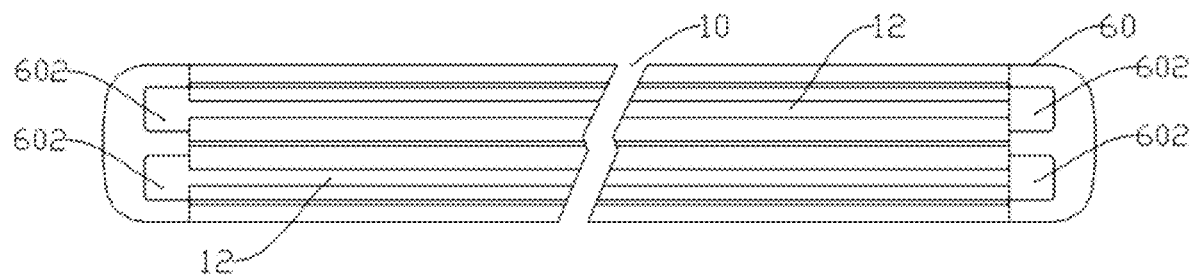
FIG. 8 is a side view of a rack crossbar body according to the embodiment of the present application.

Further, as shown in FIG. 8, the closure heads 60 at both ends of the rack crossbar body 10 in this embodiment are further provided with mounting rabbets 602. With the mounting rabbet, the second mounting component of different structures can be mounted on the second mounting groove 12.

Figure 9:
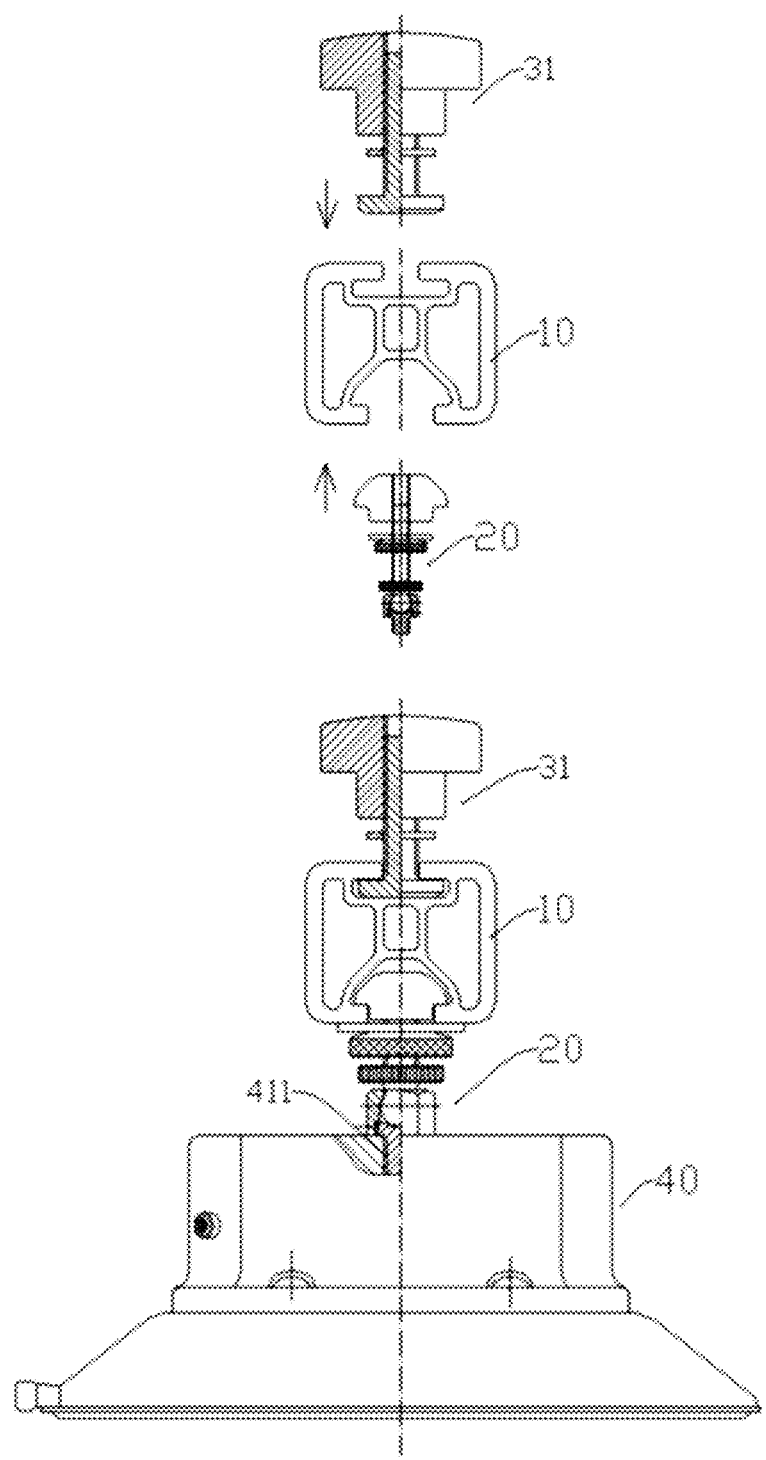
FIG. 9 is a mounting process of the structure in FIG. 1 and a sucker body.
Figure 10:
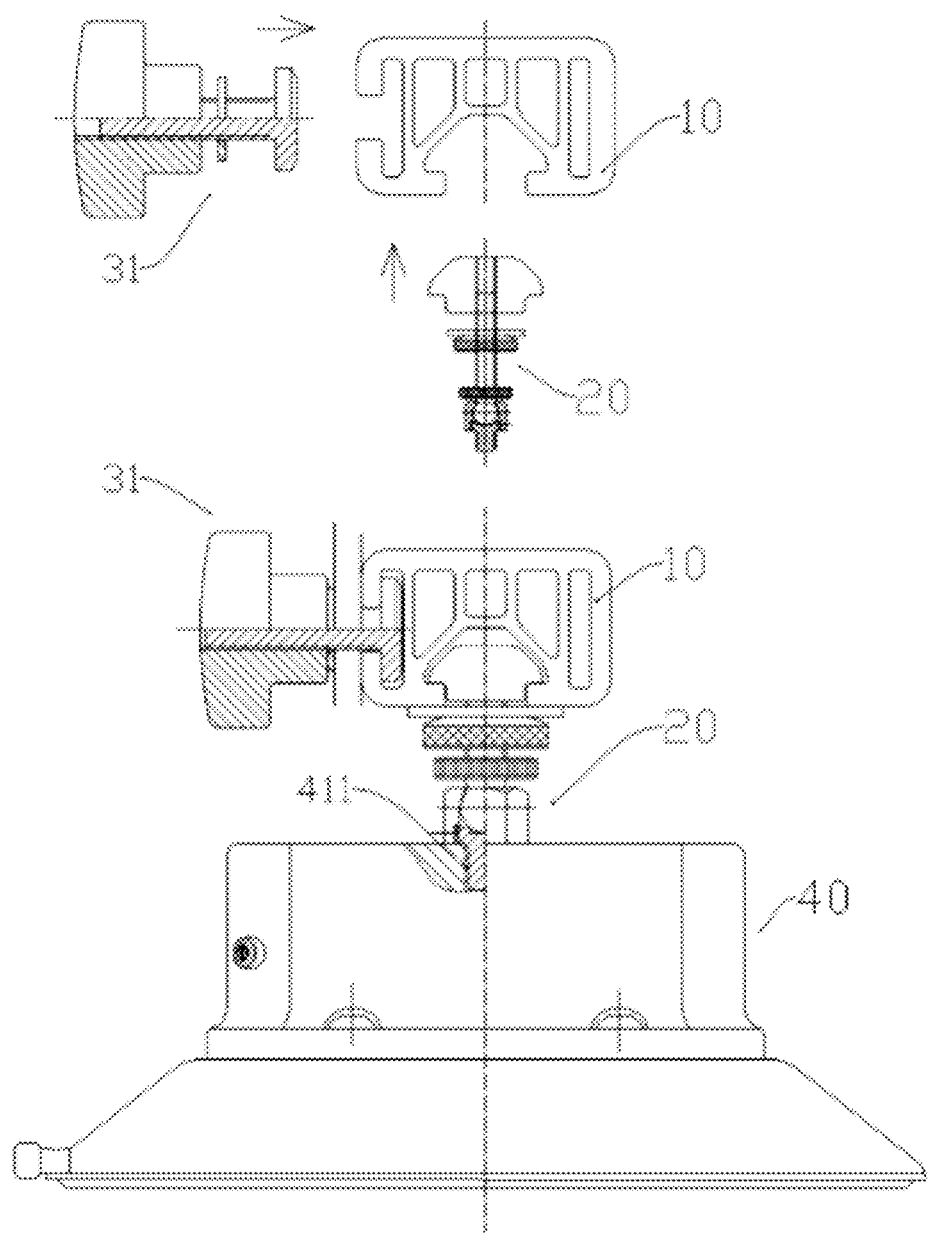
FIG. 10 is a mounting process of the structure in FIG. 2 and the sucker body.
Figure 11:
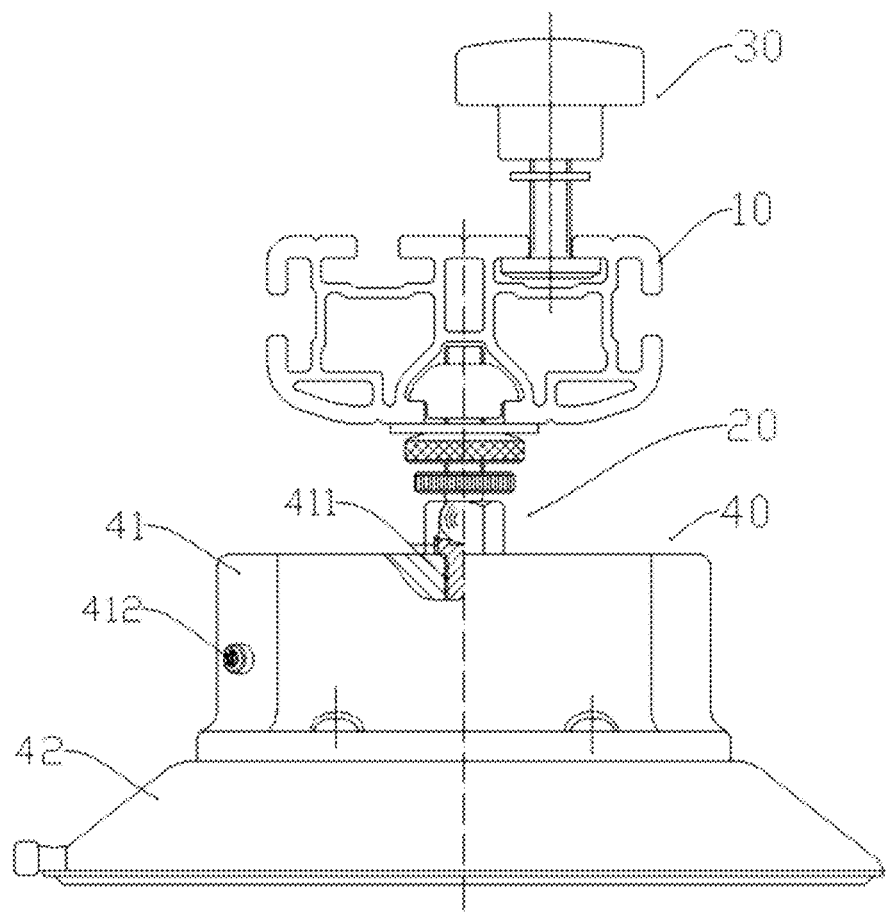
FIG. 11 is a schematic diagram in which the structure in FIG. 3 and the sucker body are connected.

FIGS. 9 to 11 are three different mounting processes of the rack crossbar body 10 and a sucker body.

Figure 14:
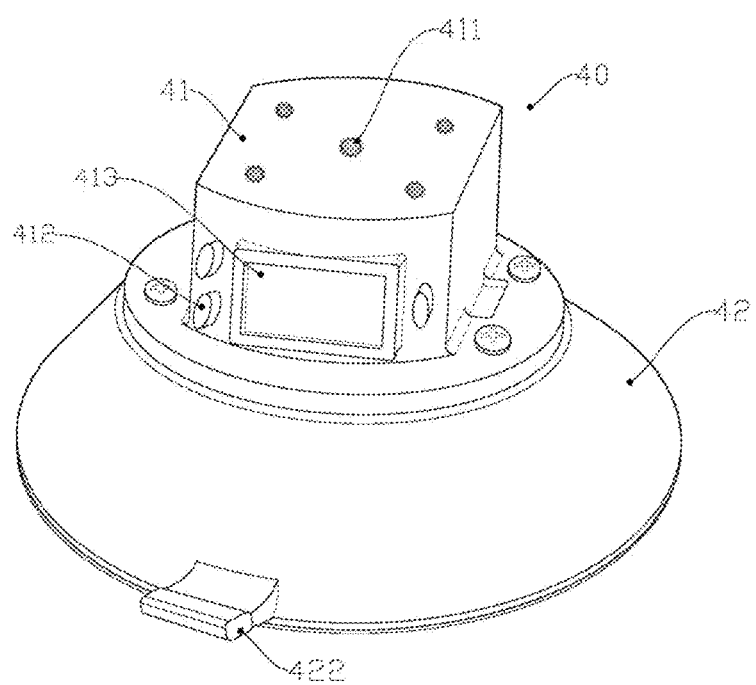
FIG. 14 is a perspective view of a sucker according to an embodiment of the present application.
Figure 15:
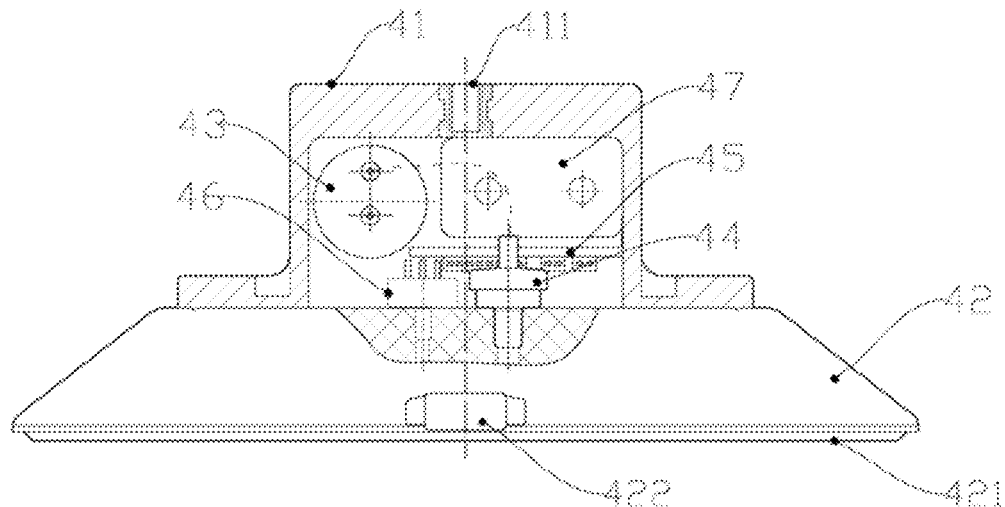
FIG. 15 is a sectional view of the sucker according to the embodiment of the present application.
Figure 16:
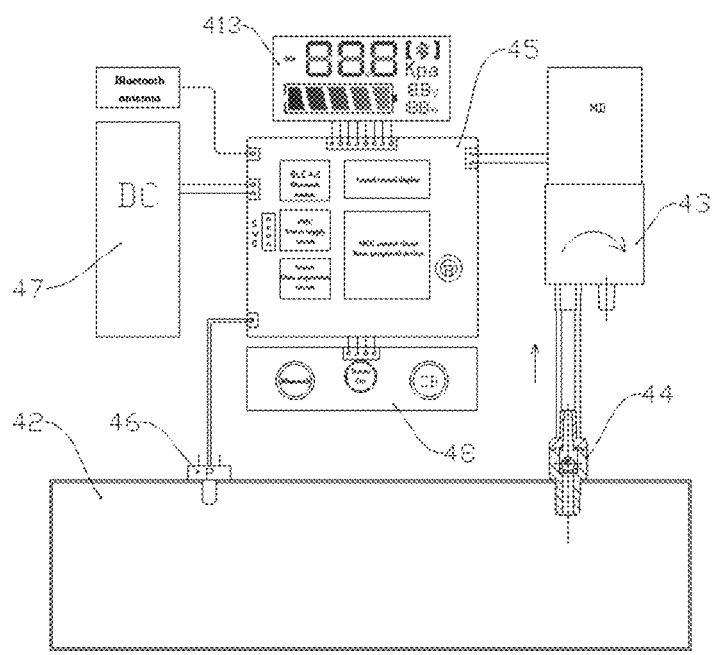
FIG. 16 is a control structure of the sucker according to the embodiment of the present application.

As shown in FIGS. 14 to 16, a sucker is further provided in this embodiment, including: the multi-purpose rack crossbar or the multi-purpose rack crossbar device. The technical solutions of the above sucker support and the sucker support device are described above and will not be repeated here.

Further, in this embodiment, the sucker further includes: a sucker body 40 fitted and connected to the first mounting component 20.

The sucker body 40 includes a suction cup 42 and a mounting base 41 for mounting the suction cup 42, and a mounting hole 411 is formed on the mounting base 41. The mounting hole 411 can be used for mounting the above third mounting groove 222 in spherical connection with the spherical structure 221 in the first mounting component 20, and the first mounting component 20 can rotate 360 degrees relative to the third mounting groove 222. Preferably, the suction cup 42 and the mounting base 41 are fixedly connected by bolts.

The sucker is preferably a fully automatic electric vacuum sucker.

Preferably, the suction cup 42 and the mounting base 41 are fixedly connected by bolts.

The sucker is an electric sucker, including a suction pump 43 having an air pipe communicated with the suction cup 42. The suction pump 43 is preferably an electric suction pump.

Further, a check valve 44 is further provided on the air pipe. The check valve 44 is preferably a one-way valve. More preferably, the check valve 44 may also be replaced with a normally closed electromagnetic gas valve.

Further, in this embodiment, an MCU control circuit, a pressure acquisition circuit, a Bluetooth transmission circuit, an LCD circuit and a power management circuit are provided on a Printed Circuit Board (PCB). The MCU control circuit is electrically connected to a pressure sensor 46, a wireless communication module, a display module 413 and a power supply 47 described below through the pressure acquisition circuit, the Bluetooth transmission circuit, the LCD circuit and the power management circuit, respectively.

The pressure acquisition circuit acquires pressure data in the pressure sensor 46, and the MCU control circuit activates the suction pump 43 through data analysis to keep the air pressure in the suction cup of the sucker always within a default safety range, and the suction state, the voltage and real-time battery level of the power supply 47, and the Bluetooth access state are displayed in real time on the display module 413 on the sucker. At the same time, interactive devices (such as a mobile phone APP) can display the operating states of the sucker and the power supply 47, and can display the information of several suckers simultaneously and alarm in case of any anomalies.

In order to intelligently control the electric sucker, in this embodiment, the display module 413 is further provided on the sucker body, and the PCB 45 electrically connected to the display module 413 is further provided inside the sucker body. The display module 413 is preferably an LCD display screen.

In this embodiment, the sucker further includes a pressure sensor 46, which is provided on the sucker body and electrically connected to the PCB 45.

A control unit 48, on which a plurality of buttons 412 such as an on-off button are provided, is further provided on the sucker body.

In this embodiment, the sucker further includes a wireless communication module, which is provided on the sucker body and electrically connected to the PCB 45. The wireless communication module is preferably a Bluetooth module.

In this embodiment, the sucker further includes an operational power supply 47 mounted on the sucker body. The power supply 47 is preferably a battery pack, such as an AA battery pack and an AAA battery pack.

A deflation yoke 422, mainly configured to deflate before removing the sucker of the rack crossbar, is further provided on the suction cup 42. Specifically, with the deflation yoke 422, when there is a need to deflate, e.g., the sucker needs to be removed, the deflation yoke 422 is pulled with an external force so that some of the air enters the suction cup 4 and the sucker is removed.

In this embodiment, the position of the mounting hole 411 or the position of the sucker body 40 may be adjusted at will depending on the width of the car, hull, etc., the height of a connecting screw may be adjusted according to an arc surface, and the spherical structure 221 can be automatically fitted to a suction surface, so that the suction of the sucker can be the maximum, and the suckers are mounted safely and reliably.

The electric sucker in this embodiment is easy to operate, safe and reliable, and, when in operation, can detect the pressure inside the suction cup 42 at any time and automatically make up air to keep the pressure always within the default safety range. The sucker can display its operating state at any time, reflect its real-time condition at any time on the interactive mobile phone APP through Bluetooth transmission, and give an alarm in time in case of any anomalies, which greatly enhances its safety and the user's confidence in use.

The specific suction method in this example may refer to steps (exemplified by one of the implementations) as follows.

Setup: The sucker is activated by pressing and holding the on/off button (SB) for 2 s, with two beeps heard. In this case, the LCD screen will be on (back light), and can display information such as vacuum level (kPa) and battery level at the same time.

When the suction pump 43 in the sucker operates, the pressure sensor 46 takes samples from the suction cup 42, and the vacuum level drops to −400 kPa to −450 kPa from 0 (where the pressure may be set in the background).

In this stage, no alarm will be given until the vacuum level reaches a default maximum threshold and the pump stops. In this case, the check valve 44 (one-way valve) is provided between the suction pump 43 and the suction cup 42 (or, the check valve is replaced with a normally closed electromagnetic gas valve, which is open and closed synchronously with the motor) to prevent the suction pump 43 from back leakage.

Then, when the vacuum level drops from the maximum value to −300 kPa, namely an early-warning threshold (set in the background), an early-warning indicator on the LCD screen flickers and an alarm will be given.

The motor of the suction pump 43 automatically starts up for air suction to the maximum value (vacuum), and stops when flickers and alarms stop, and this cycle repeats, so that the vacuum level in the suction cup 42 is always kept between the early-warning threshold and the maximum value.

The LCD screen is on when the motor starts, and is off 10 s (settings) after the suction pump 43 stops operating until the motor starts up again (with the purpose of power saving).

In case of screen off, the screen will be on by pressing (a screen on button), so that the real-time vacuum level and the actual voltage and battery level can be displayed, and the battery to be recharged is displayed at the left bottom of the screen.

The (Bluetooth) button is pressed to enable Bluetooth access. In this case, data can be transmitted with electronic devices such as a mobile phone, so that the access status, vacuum level, battery voltage and level are displayed through a mobile phone APP. When the vacuum level is lower than the early-warning threshold or the battery voltage is lower than the minimum operating voltage, an alarm will be given in real time on the APP. The Bluetooth access can be disabled by tapping the (Bluetooth) button, and the Bluetooth disappears from the screen.

The sucker is deactivated by pressing and holding the on/off button (SB), with three beeps heard.

The battery level is incrementally displayed on the LCD screen. Generally, five compartments represent full charge (above 2.5V). When the battery level drops to two compartments (below 1.5V), this compartment flickers and the battery needs to be replaced. The electric sucker is preferably provided with ordinary AA batteries.

Figure 12:
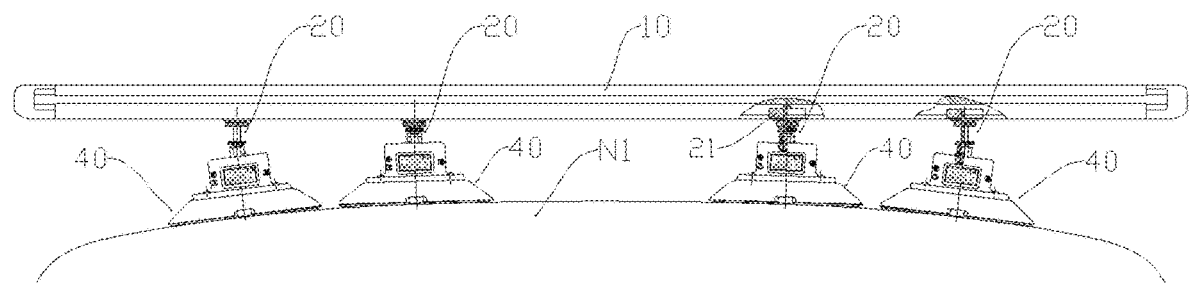
FIG. 12 is a structural diagram of the multi-purpose rack crossbar mounted on a car roof according to the embodiment of the present application.
Figure 13:
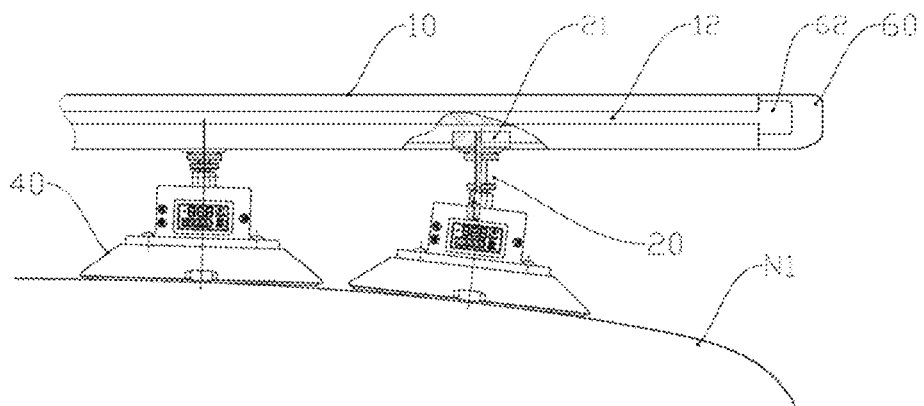
FIG. 13 is a partial enlarged view of the structure in FIG. 12.

Further, the sucker in this embodiment may also be applied to other application scenarios, such as a scenario in which the suckers are mounted on a car roof as shown in FIGS. 12 and 13.

Figure 17:
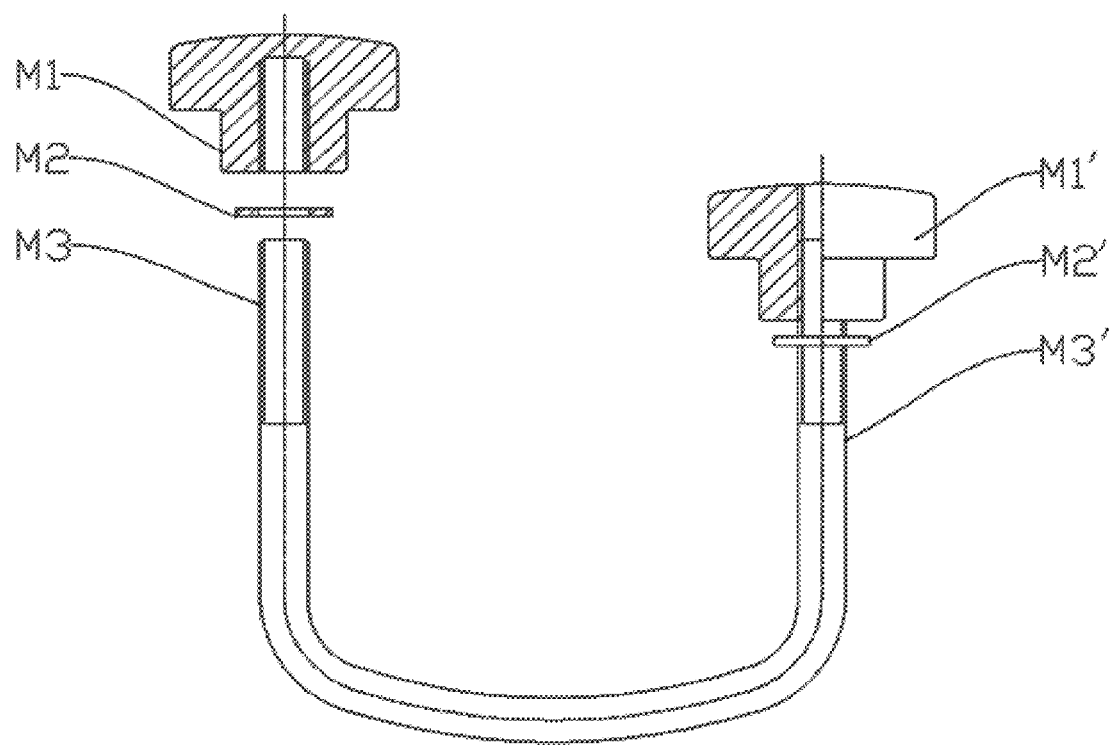
FIG. 17 is a structural diagram of an existing accessory.
Figure 18:
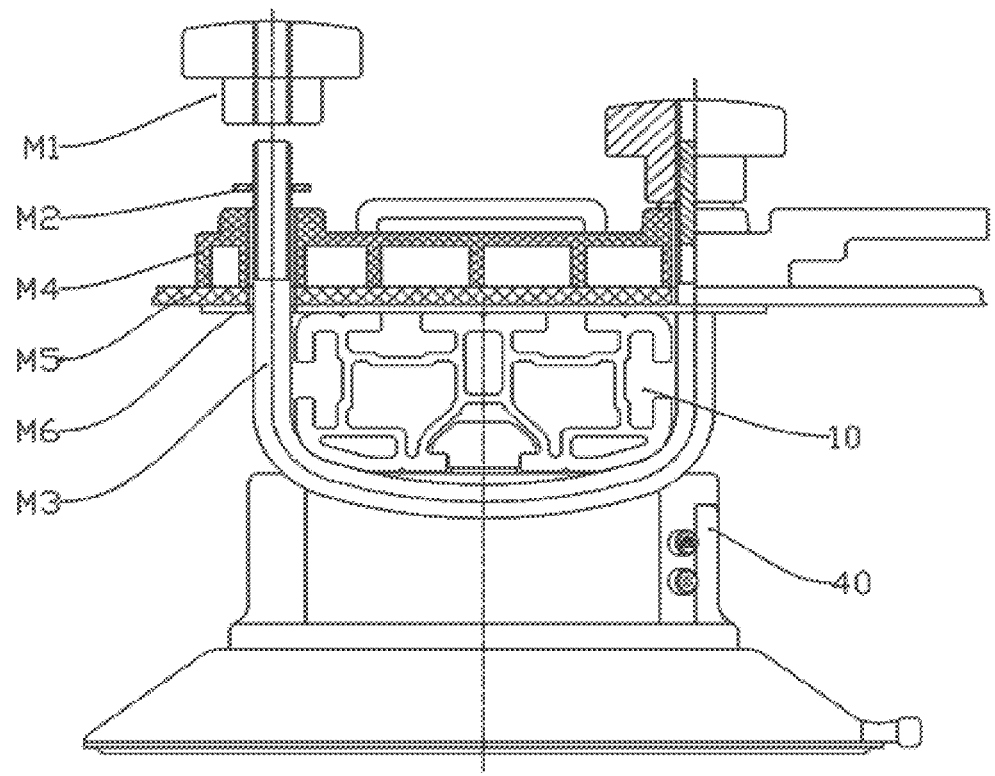
FIG. 18 is a first application scenario of the multi-purpose rack crossbar according to the embodiment of the present application.

As shown in FIGS. 17 and 18, the vehicle-mounted rack in this embodiment may also be fitted to and used together with an existing universal component for mounting vehicle-mounted luggage cases, so the rack in this embodiment is more highly adaptive.

Specifically, the universal component for mounting vehicle-mounted luggage cases includes a star grip knob M1, a gasket M2, a mounting accessory M4, a luggage base M5, a protection pad M6, and a U-shaped fixed link M3 which is mounted on the rack crossbar body 10, where the rack crossbar body 10 is provided with a lower arc surface fitted to the U-shaped fixed link M3. In addition, the protection pad M6, the luggage base M5 and the mounting accessory M4 are mounted on the U-shaped fixed link M3 from bottom to top, and the gasket M2 and the star grip knob M1 are respectively mounted at two free ends of the U-shaped fixed link M3.

The sucker described in this embodiment can be suitable for different vehicle models, especially for vehicle models without a roof rack and traffic facilities such as yachts. The above sucker body 40 can be used together with the rack crossbar body 10, the first mounting component 20, the second mounting component and other components, and different external hanging devices can be mounted at any time as needed. Each vacuum sucker used together with the rack crossbar body 10 can automatically adjust the goodness of fit to the surface of a sucked object. The vehicle-mounted rack is firmly sucked on a suction surface of the vacuum suckers through electric suction.

Figure 19:
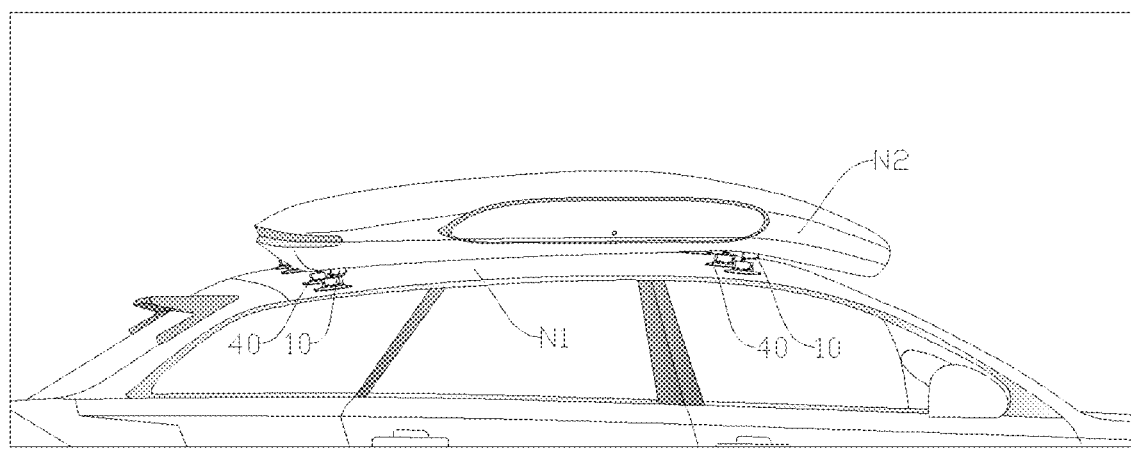
FIG. 19 is a second application scenario of the multi-purpose rack crossbar according to the embodiment of the present application.
Figure 20:
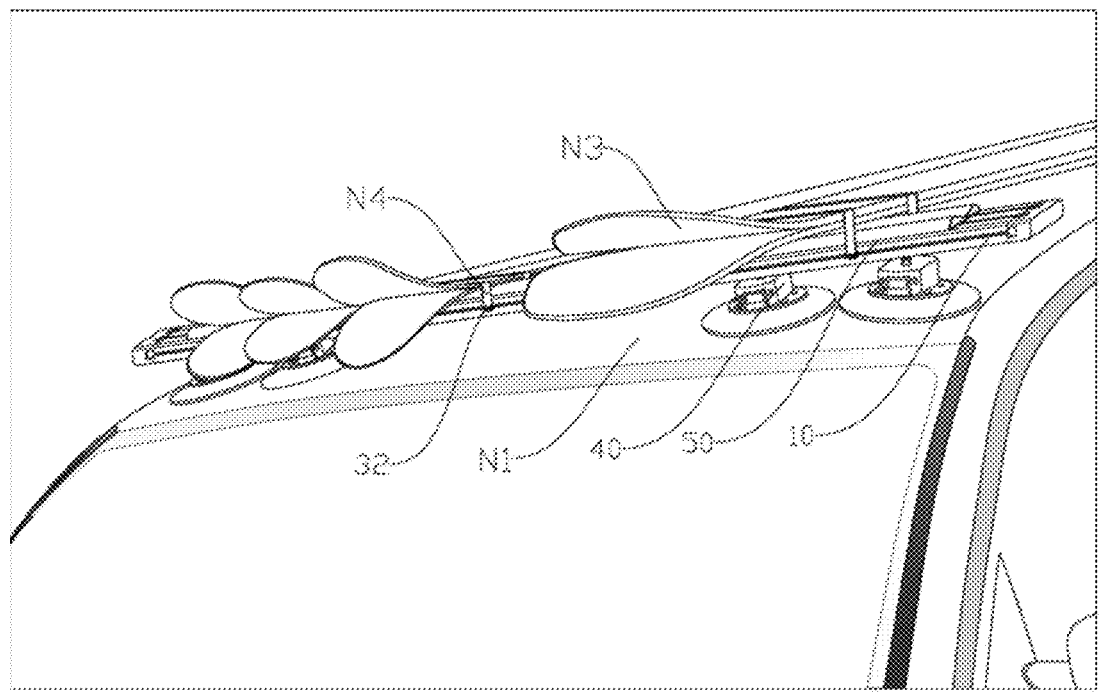
FIG. 20 is a third application scenario of the multi-purpose rack crossbar according to the embodiment of the present application.
Figure 21:
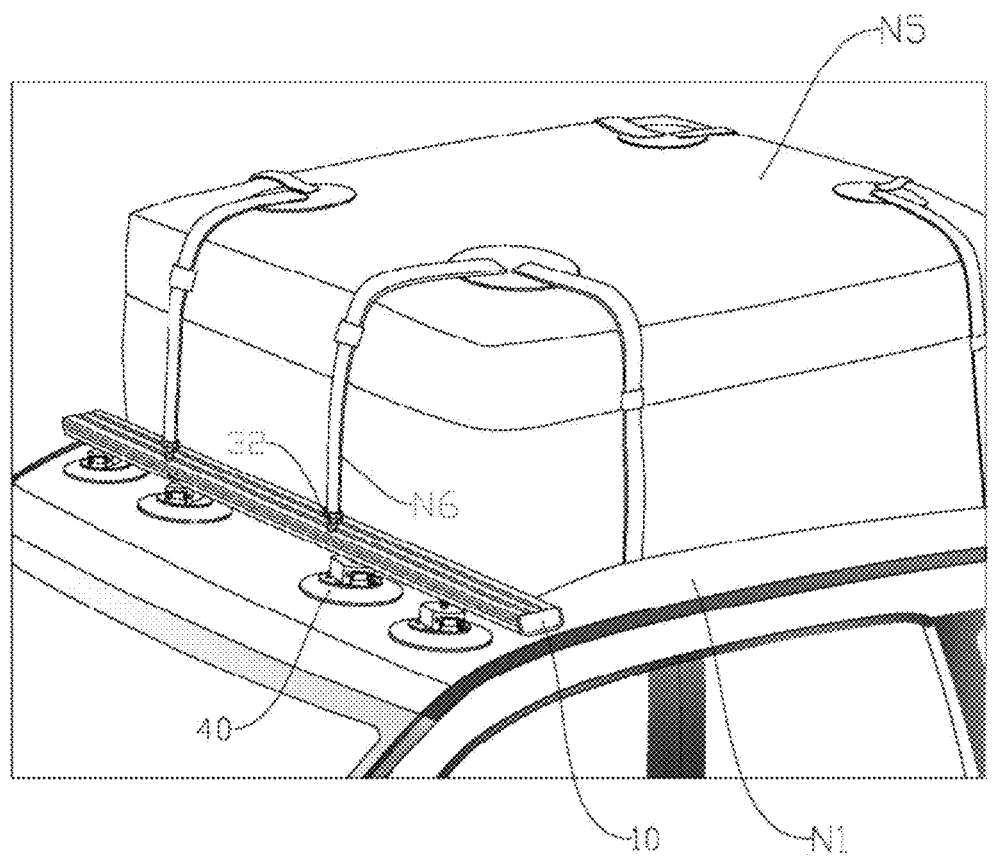
FIG. 21 is a fourth application scenario of the multi-purpose rack crossbar according to the embodiment of the present application.

For another example, as shown in FIG. 19, the suckers in this embodiment are applied to a car roof N1 and the like for mounting a luggage case N2. As shown in FIG. 20, the suckers in this embodiment are applied to the car roof N1 for mounting skateboards N3. Specifically, first ties N4 and other structures may be used together to aid in fastening the skateboards N3. For another example, as shown in FIG. 21, the suckers in this embodiment are applied to the car roof N1 for mounting a luggage case N5. Similarly, second ties N6 and other structures may be used together to aid in fastening the luggage case N5.

In the description of the present application, the terms "connected", "connection", "fixedly" and "fixed" shall be construed broadly unless otherwise expressly specified and defined. For example, the connection may be fixed connection, removable connection, or integrated connection; mechanical connection or electrical connection; direct connection or indirect connection through intermediate components, and may also be the internal connection or interaction between two components. Those of ordinary skill in the art may understand the specific meanings of the above terms in the present application on a case-by-case basis.

In the present application, unless otherwise specified and limited, any reference to a first feature "above" or "below" a second feature may include the direct contact between the first and second features, and may also include the contact between the first and second features through other intermediate features instead of direct contact. Further, any reference to the first feature "above" the second feature includes the first feature right above and diagonally above the second feature, or simply indicates that the first feature is higher than the second feature. Any reference to the first feature "below" the second feature includes the first feature under and diagonally below the second feature, or simply indicates that the first feature is lower than the second feature.

In the embodiments of the present application, the terms "upper", "lower", "left", "right", and other orientations or positional relationships are based on the orientations or positional relationships as shown in the drawings, which are not used for indicating or implying that the devices or elements must have a particular orientation and be construed and operated in a particular orientation, but merely for facilitating description and simplifying operation, and therefore are not to be construed as limiting the present application. In addition, the terms "first" and "second" are merely used for descriptive distinction and have no special meaning.

The above embodiments are not used for limiting but merely for describing the technical solutions of the present application. The present application is described in detail with reference to the preferred embodiments. It will be understood by those of ordinary skill in the art that modifications or equivalent substitutions may be made to the technical solutions of the present application without departing from the spirit and scope of the technical solutions of the present application and shall fall into the scope of the claims of the present application.

What is claimed is:

1. A multi-purpose rack crossbar, comprising: a rack crossbar body, and a first mounting component connected to the rack crossbar body; the rack crossbar body is provided with a first mounting groove and at least one second mounting groove, the first mounting groove is connected to a first end of the first mounting component, and a runner assembly is provided at a second end of the first mounting component; wherein the second mounting groove comprises: a second opening portion and a second receiver which is connected to and wider than the second opening portion; wherein the second receiver comprises: a first rectangular portion connected to the second opening portion; wherein the runner assembly comprises: a universal structure consisting of a spherical structure and a third mounting groove fitted to the spherical structure.

2. The multi-purpose rack crossbar according to claim 1, characterized in that the first mounting groove comprises: a first opening portion, and a first receiver which is connected to and wider than the first opening portion.

3. The multi-purpose rack crossbar according to claim 2, characterized in that the first receiver comprises: a first tapered portion and a first top, which are connected to each other and at least enclosed to form the first receiver having an opening.

4. The multi-purpose rack crossbar according to claim 3, characterized in that the width of a large end of the first tapered portion gradually decreases to that of a small end thereof, wherein the large end is connected to the first opening portion while the small end is connected to the first top.

5. The multi-purpose rack crossbar according to claim 1, characterized in that the first mounting component comprises: a mounting slider fitted to the first mounting groove, and a mounting rod with a first end connected to the mounting slider and a second end connected to the spherical structure.

6. The multi-purpose rack crossbar according to claim 5, characterized in that a receiving space for adjusting the mounting rod in the vertical direction is further provided on the top of the first mounting groove.

7. The multi-purpose rack crossbar according to claim 5, characterized in that the first mounting component further comprises: at least one retaining clip mounted on the mounting rod.

8. The multi-purpose rack crossbar according to claim 7, characterized in that when the mounting rod is of a screw structure, the retaining clip comprises: a nut structure fitted to the screw structure.

9. The multi-purpose rack crossbar according to claim 1, characterized in that the second receiver further comprises: a first retaining nest; the first rectangular portion and the first retaining nest are connected to each other and at least enclosed to form the second receiver having an opening.

10. The multi-purpose rack crossbar according to claim 9, characterized in that the first rectangular portion is connected to a large end of the first retaining nest.

11. The multi-purpose rack crossbar according to claim 9, characterized in that the first rectangular portion is wider than the second opening portion, and is wider than or as wide as the large end of the first retaining nest.

12. The multi-purpose rack crossbar according to claim 11, further comprising a closure head mounted at each end of the rack crossbar body, and a connecting portion of the closure head is in drive fit and connected to a plurality of hollow channels in the rack crossbar body; and/or recess holes fitted to the second mounting groove are further formed in the closure head.

13. The multi-purpose rack crossbar according to claim 12, characterized in that the rack crossbar body is of an axisymmetric structure.

14. A multi-purpose rack crossbar device, comprising: a multi-purpose rack crossbar, wherein the multi-purpose rack crossbar comprises: a rack crossbar body, and a first mounting component connected to the rack crossbar body; the rack crossbar body is provided with a first mounting groove and at least one second mounting groove, the first mounting groove is connected to a first end of the first mounting component, a second mounting component, wherein the second mounting component is fitted and connected to the at least one second mounting groove, and a runner assembly is provided at a second end of the first mounting component; wherein the second mounting groove comprises: a second opening portion and a second receiver which is connected to and wider than the second opening portion; wherein the second receiver comprises: a first rectangular portion connected to the second opening portion; wherein the runner assembly comprises: a universal structure consisting of a spherical structure and a third mounting groove fitted to the spherical structure.

15. The multi-purpose rack crossbar device according to claim 14, characterized in that the second mounting component comprises: a first fixed link fitted to the second mounting groove.

16. The multi-purpose rack crossbar device according to claim 15, characterized in that the second mounting component further comprises: a grip knob, and the first fixed link fitted and connected to the grip knob.

17. The multi-purpose rack crossbar device according to claim 15, characterized in that the second mounting component comprises: a second fixed link, and a retainer fitted to the second fixed link and the second mounting groove.

18. The multi-purpose rack crossbar device according to claim 17, characterized in that when the second fixed link is a mounting bolt, the second mounting component further comprises: a nut and a gasket, which are both fitted and connected to and mounted on the second fixed link.

19. The multi-purpose rack crossbar device according to claim 17 or 18, characterized in that a movable lifting yoke is further provided at one end of the second fixed link.

20. The multi-purpose rack crossbar device according to claim 14, characterized in that the second mounting component further comprises: an anti-skid rubber protection pad, on which at least one mounting portion fitted to the second mounting groove is provided.

21. A sucker, comprising the multi-purpose rack crossbar, or the multi-purpose rack crossbar device according to claim 14.

22. The sucker according to claim 21, characterized in that the sucker body comprises: a suction cup and a mounting base for mounting the suction cup, and a mounting hole is formed on the mounting base.

23. The sucker according to claim 22, characterized in that a deflation yoke is further provided on the suction cup.

24. The sucker according to claim 23, characterized in that the sucker is an electric sucker, comprising a suction pump having an air pipe communicated with the suction cup.

25. The sucker according to claim 24, wherein a check valve is further provided on the air pipe.

26. The sucker according to claim 25, wherein the check valve is replaced with a normally closed electromagnetic gas valve.

27. The sucker according to any one of claims 22 to 26, characterized in that a Printed Circuit Board (PCB) is further provided inside the sucker body, and an MCU control circuit, a pressure acquisition circuit, a Bluetooth transmission circuit, an LCD circuit and a power management circuit are provided on the PCB.

28. The electric sucker according to claim 26, characterized in that a display module electrically connected to a Printed Circuit Board (PCB) is further provided on the sucker body.

29. The electric sucker according to claim 26, further comprising a pressure sensor, which is provided on the suction cup and electrically connected to a Printed Circuit Board (PCB).

30. The sucker according to any one of claims 22 to 26, further comprising an operational power supply mounted on the sucker body.

31. The sucker according to any one of claims 22 to 26, characterized in that a plurality of buttons are further provided on the sucker body.

32. The sucker according to claim 26, further comprising a communication module, which is provided on the sucker body and electrically connected to a Printed Circuit Board (PCB).

33. The electric sucker according to claim 32, wherein a wireless communication module comprises: a Bluetooth module.

* * * * *